United States Patent [19]

Bartys

[11] Patent Number: 5,152,093
[45] Date of Patent: Oct. 6, 1992

[54] FISHING TIP-UP CONSTRUCTION

[76] Inventor: Bernard A. Bartys, 771 Saganing Rd., Bentley, Mich. 48613

[21] Appl. No.: 712,428

[22] Filed: Jun. 10, 1991

[51] Int. Cl.⁵ .................... A01K 97/12; A01K 97/10
[52] U.S. Cl. ........................................ 43/17; 43/21.2; 248/520
[58] Field of Search ............... 43/17, 21.2, 25, 16; 248/520, 528, 538, 529

[56] References Cited

U.S. PATENT DOCUMENTS

| | | | |
|---|---|---|---|
| 479,219 | 7/1892 | Lane | 43/17 |
| 1,778,422 | 10/1930 | Joyal | 43/17 |
| 2,136,864 | 11/1938 | Paquette | 43/17 |
| 2,775,053 | 12/1956 | Knoll | 43/17 |
| 2,785,491 | 3/1957 | Gibson | 43/17 |
| 2,869,814 | 1/1959 | Hurlimann | 248/529 |
| 2,973,929 | 3/1961 | Zawadzki | 248/528 |
| 3,807,078 | 4/1974 | Bartye | 43/17 |
| 4,146,988 | 4/1979 | Bednarczyk | 43/17 |
| 4,550,520 | 11/1985 | Bogue | 43/21.2 |
| 4,793,087 | 12/1988 | McGee | 43/23 |

FOREIGN PATENT DOCUMENTS 2199721  7/1988  United Kingdom ................ 43/21.2

Primary Examiner—Richard K. Seidel
Assistant Examiner—James Miner
Attorney, Agent, or Firm—Learman & McCulloch

[57] ABSTRACT

A fishing tip-up construction for a rod on which is mounted a supporting stand having a pair of legs movable between retracted and extended positions. The rod terminates at one end in a downwardly bent grip which, together with the legs, forms a stable three-point support for the rod. A fishing line is wound on a reel that is supported on the rod between the grip and the stand. A signal device is movable from an inactive position to a signalling position in response to the application in one direction of a force on the fishing line. The force required to effect movement of the signalling device to the signalling position is adjustable.

31 Claims, 4 Drawing Sheets

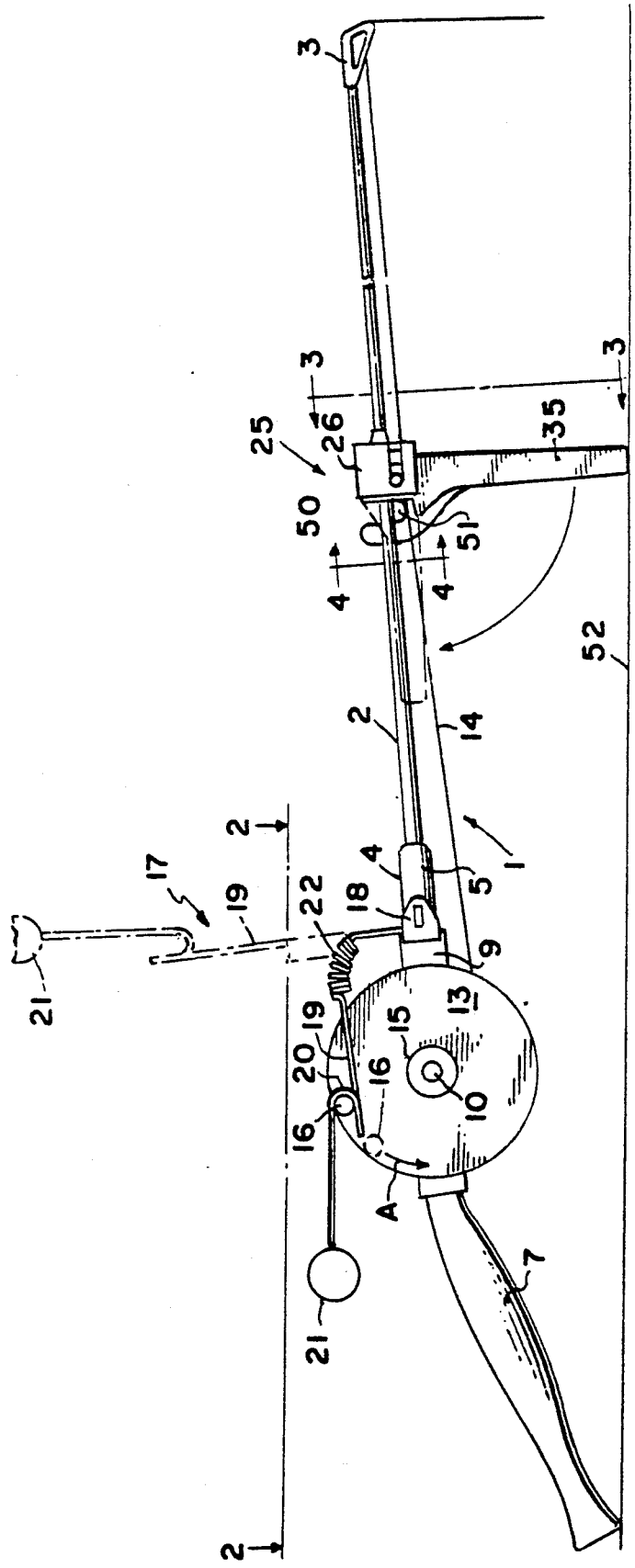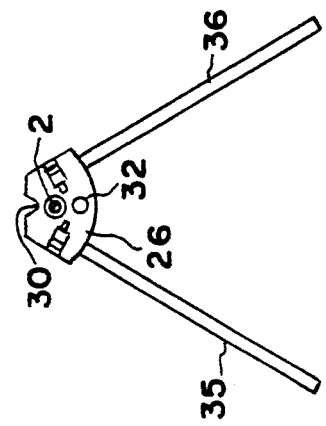

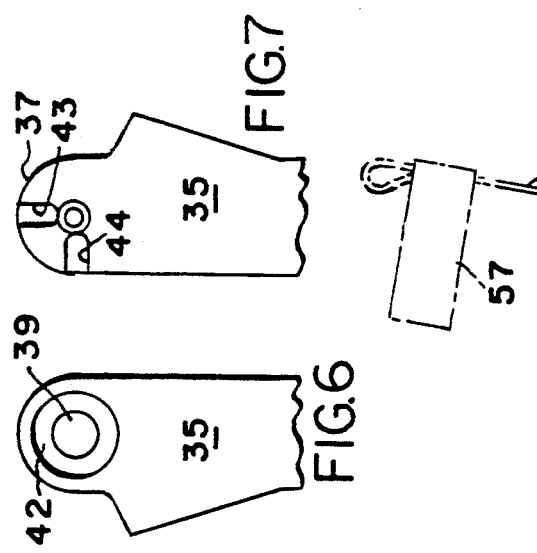
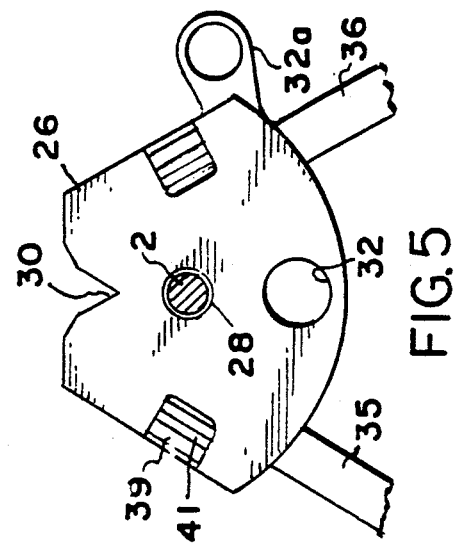
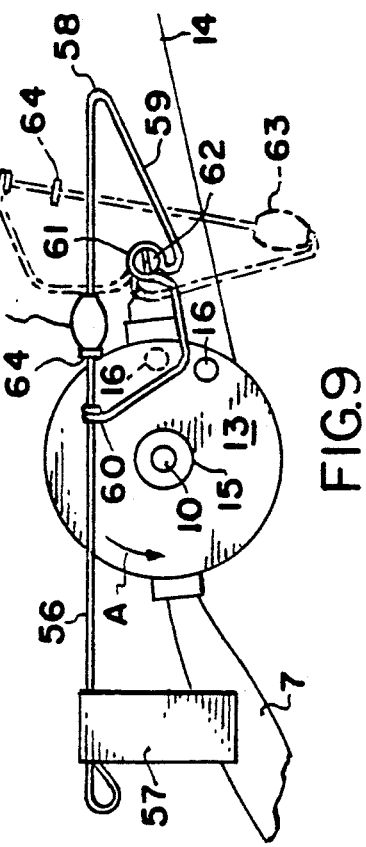
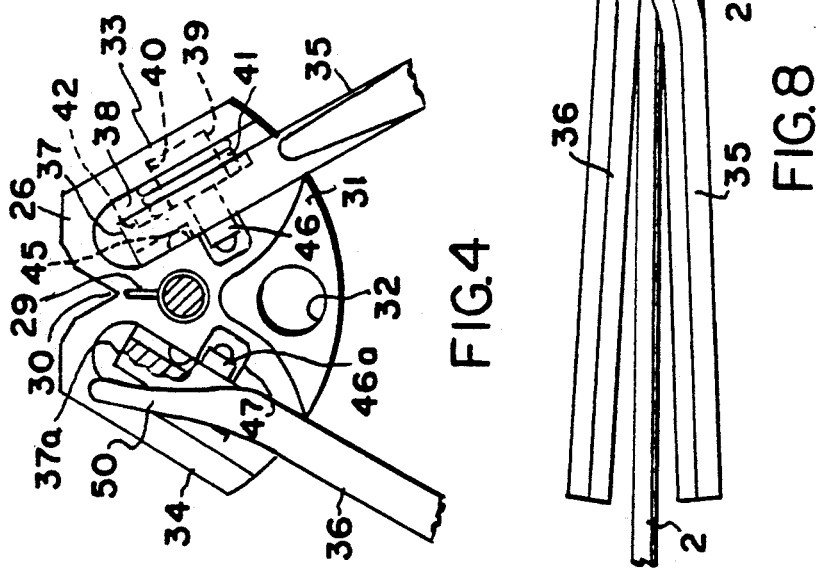

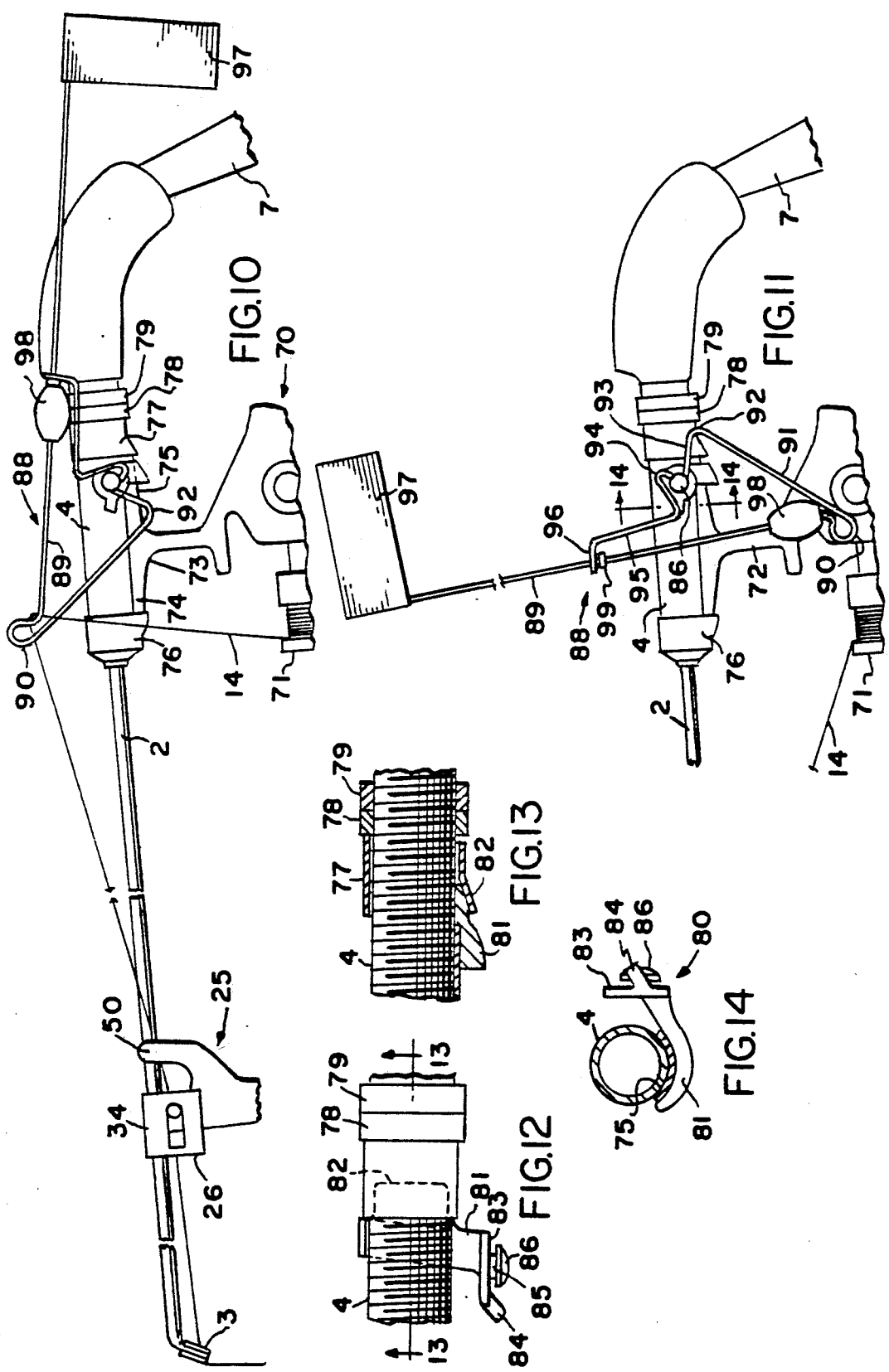

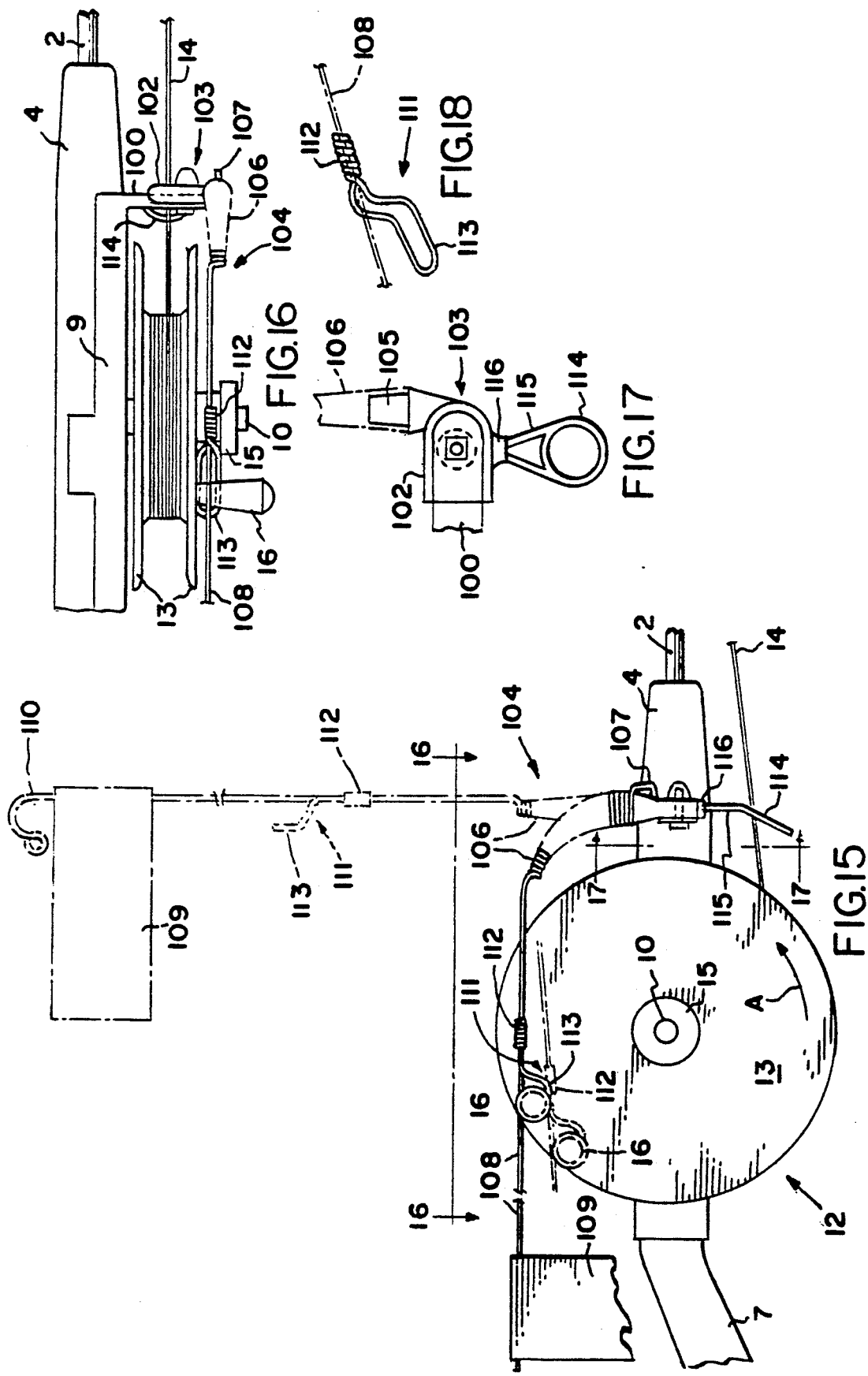

FISHING TIP-UP CONSTRUCTION

This invention relates to a fishing tip-up construction of the kind having a signal which is movable from a stored position to a signalling position in response to the application of a force in one direction on a fishing line that is wound around a reel supported by a fishing rod.

BACKGROUND OF THE INVENTION

The prior art contains many examples of fishing tip-ups. Most tip-ups include an arm having a flag or other indicator which, in response to the taking of bait by a fish, is operable to move from a stored or inactive position to a signalling or active position to indicate to the fisherman that a fish has disturbed the bait. Many of the known tip-up constructions are cumbersome, complicated, difficult to manipulate in cold weather, and susceptible to separation. Another difficulty with many of the known tip-ups is that the force which must be applied to the signalling means to move it from its stored to its signalling position may be so great that a bait can be stolen by a fish without activating the signalling means.

Another disadvantage of some tip-ups is that the signal actuating mechanism may be inoperative unless the tip-up is supported in a level position. In many instances, however, the surface of the ground or ice on which the tip-up is supported is not level.

Most tip-ups are adapted for use with special reels or fishing rods and are incapable of application to conventional rods and reels.

Apparatus constructed in accordance with the invention is adapted to overcome the problems referred to above.

SUMMARY OF THE INVENTION

Apparatus constructed in accordance with the disclosed embodiments of the invention is adapted for use with a fishing rod on which is mounted a reel having a fishing line wound thereon. The fishing rod may be a conventional rod or one that is especially adapted for unattended use and which is so constructed as to be supported in stable condition on a level or uneven supporting surface. In a preferred embodiment the rod has its rearward end bent downwardly and carries between its ends a support stand having a pair of legs movable from retracted positions to extended positions and which, in the latter positions, form with the bent end of the rod three stable support points for the rod. The three support points are so spaced from one another as to provide between the rear end of the rod and the supporting stand adequate space to accommodate the reel between the rod and the supporting surface.

The support stand not only includes the retractable and extensible legs, but also provides for the accommodation of a single or multiple barb hook and a retainer for maintaining the hook in stored condition whenever the support legs are in their retracted positions.

The apparatus includes signalling means comprising an arm which is movable from a stored or inactive position to an active or signalling position in response to the application on a fishing line of a force such as that resulting from the taking of bait by a fish. In some of the embodiments the signalling arm is movable to its signalling position in response to rotation of the reel on which the fishing line is wound. In other embodiments the signal arm is movable to its signalling position in response to the application of a fish-induced force on the fishing line and regardless of whether the reel moves.

In two embodiments the signalling arm includes a spring which normally biases the arm to its signalling position, whereas in other embodiments the signalling arm forms part of a signalling member which is rotatable about an axis from its inactive position to its signalling position. In these embodiments the signalling member has associated therewith a movable weight which, according to its position, adjusts the force which must be applied to the fishing line to effect movement of the signalling arm to its signalling position.

In any of the disclosed embodiments the pivoted signalling member may be applied to a fishing rod and retained thereon by the same retainers by which the fishing reel is secured to the rod. As a consequence, the signalling means may be applied to any rod on which a reel may be mounted, regardless of whether the rod is intended for unattended use.

THE DRAWINGS

Preferred embodiments of the construction are illustrated in the accompanying drawings, wherein:

FIG. 1 is a side elevational view of a fishing rod and tip-up construction;

FIG. 2 is a fragmentary plan view of a portion of the apparatus shown in FIG. 1;

FIG. 3 is a sectional view taken on the line 3—3 of FIG. 1;

FIG. 4 is a fragmentary, greatly enlarged sectional view taken on the line 4—4 of FIG. 1;

FIG. 5 is a view similar to FIG. 4, but illustrating the opposite side of the apparatus;

FIGS. 6 and 7 are front and rear side elevational views, respectively, of one of the support legs forming part of the invention;

FIG. 8 is an enlarged, top plan view of another portion of the apparatus shown in FIG. 1;

FIG. 9 is a fragmentary, side elevational view of a modified form of the apparatus;

FIG. 10 is a fragmentary, side elevational view of another modification;

FIG. 11 is a fragmentary view of a portion of the apparatus shown in FIG. 10, but with certain parts in adjusted positions;

FIG. 12 is a greatly enlarged, fragmentary top plan view of a portion of the apparatus shown in FIG. 11;

FIG. 13 is a sectional view taken on the line 13—13 of FIG. 12;

FIG. 14 is an enlarged sectional view taken on the line 14—14 of FIG. 11;

FIG. 15 is a fragmentary side elevational view of another embodiment;

FIG. 16 is a plan view taken on the line 16—16 of FIG. 15;

FIG. 17 is an enlarged sectional view taken on the line 17—17 of FIG. 15; and

FIG. 18 is an isometric view of a part of the apparatus.

THE DISCLOSED EMBODIMENTS

Apparatus constructed in accordance with one embodiment of the invention is illustrated in FIGS. 1-8 as comprising a fishing rod 1 having a shank 2 terminating at its forward end in a line guide or eye 3 and being fitted at its other end in a handle 4 having a relatively straight section 5 bent at an obtuse angle between its ends to form a grip 7.

Secured to the straight section 5 of the handle 4 by screws 8 or the like is a foot 9 having a spindle 10 on which is rotatably mounted a spool 11 of a metal or plastic fishing reel 12. The spool has a pair of spaced apart sides 13 between which a fishing line 14 may be wound. A retainer 15 maintains the reel 12 on the spindle 10. One of the sides 13 of the reel has a knob or projection 16 by means of which manual rotation of the reel is facilitated.

The apparatus includes signalling means 17 comprising a base 18 that is fixed to the handle 4 or to the foot g in any suitable manner. Anchored in the base 18 is one end of a signalling arm 19 having a finger or retainer 20 between its ends which forms with the arm 19 a space adapted to accommodate the reel projection 16. The opposite end of the arm 19 carries a colorful bead, flag, or other signal device 21. Between the ends of the arm 19 is an operating member in the form of a coiled cylindrical spring 22 which normally biases the arm 19 to an upright, signalling position shown in chain lines in FIG. 1, but which enables the arm to be rocked to an inactive or stored position as shown in full lines in FIGS. 1 and 2 in which the major portion of the signalling arm is in a substantially horizontal position.

Secured to the rod shank 2 between its free, forward end 3 and the handle 4 is a preferably plastic supporting stand 25 comprising a generally triangular body 26 having an opening 27 therein in which the shank 2 is snugly accommodated. The opening 27 may be lined at its forward end by an annular, ceramic or other grommet 28 if desired. In communication with the opening 27 at the rear face of the body is a slot or notch 29 for a purpose that presently will be explained. The upper surface of the body has a V-shaped groove 30 therein, and the lower part of the body has a web 31 in which is a line guide opening 32. The opening 32 is wholly within the confines of the body 26. If desired, however, a line guide 32a may be molded with the body 26 and extend from one side thereof to facilitate positioning of the line 14 between the sides 13 of the reel during rewinding of the line.

The body 26 is provided with enlarged lateral members 33 and 34 for the accommodation of support legs 35 and 36, respectively. The support leg 35 has an upper end 37 that is accommodated in a chamber 38 formed in the enlargement 33 and carries a stub shaft 39 that is rotatably fitted into a socket 40 formed in the outer wall of the enlargement 33. The shaft 39 is encircled by a compression spring 41 which at one end bears against the adjacent wall of the recess 38 and at its opposite end is accommodated in a groove 42 formed in the upper end 37 of the leg 35. The spring 41 constantly biases the upper end 37 of the leg 35 toward the center of the body 26.

The surface of the leg 35 opposite the spring 41 is provided with a pair of detent grooves 43 and 44 that are circumferentially spaced from one another by about 90°. Each groove is adapted to accommodate a latching bar 45 that is formed on and projects from that face of the recess 38 which confronts the upper end 37 of the leg 35. The arrangement is such that the bar 45 is capable of being accommodated in either of the grooves 43 and 44 so as releasably to retain the leg 35 in either one of two mutually normal positions of rotary adjustment. The stub shaft includes an extension 46 which is accommodated in a groove 47 formed in the enlargement 33.

The body 26 and the upper end of the leg 35 have parts corresponding to those just described with reference to the leg 35, and such parts are identified by corresponding reference characters followed by the suffix a.

The leg 36 has adjacent its upper end an extension or guard finger 50 which is spaced from the body 26 by a groove 51. The purpose of the finger 50 will be explained shortly.

To condition the apparatus thus far described for use the reel 12, having a quantity of fishing line 14 wound thereon, is mounted on the fishing rod 1 and the free end of the line is threaded through the line guides 32 or 32a and 33 and secured to a live or artificial bait. The legs 35 and 36 of the stand 25 may be rocked from the retracted positions indicated in chain lines in FIG. 1 to the extended positions shown in full lines in FIG. 1. A desired length of line 14 may be unwound from the reel 12 so as to position the bait at a desired depth in a body of water. Thereafter, the arm 19 of the signalling means 17 may be rocked to the stored or full line position shown in FIG. 1 and the projection 16 of the reel fitted into the retainer 20, thereby enabling the loop to position the arm in its inactive mode. The legs 35, 36 and the rear end of the grip 7 may be placed on a supporting surface 52 so as to form three support points for the rod shank 2. As is shown clearly in FIG. 3, the free ends of the legs 35 and 36 are spaced widely apart so as to provide, together with the free end of the grip 7, a stable support for the fishing rod. The supporting surface 52 may be the ground, ice, a plank, or any other desired object. The angle at which the grip is bent with respect to the rod shank 2 and the location of the stand are such as to provide ample clearance between the shank 2 and the surface 52 for the reel 12.

When a fish takes the bait an unwinding force will be exerted on the fishing line in such direction as to cause the reel 12 to rotate in the direction of the arrow A shown in FIG. 1. Such rotation of the reel will cause the projection 16 to be withdrawn from the retainer 20 of the signalling device 17, thereby enabling the operating spring 22 to move the signalling arm from its stored or inactive position to the upright, signalling position shown in chain lines in FIG. 1. The fisherman then will be informed that the bait has been taken by a fish. Since the projection 16 will be disengaged from the retainer 20 only in response to rotation of the reel 12, there is no requirement that the rod be supported on a level surface.

When it is desired to move or store the fishing rod, without removal of the hook or lure, the shank of the hook may be fitted into the recess 30 at the upper end of the stand body 26. If the hook has one or more barbs, one of the barbs may be accommodated in the groove 29, following which rocking of the leg 36 to its retracted position will enable the guard finger 50 to overlie the hook and retain the barb of the hook in the groove 29. Inadvertent withdrawal of the barb from the groove 29 thus is avoided.

The embodiment shown in FIG. g comprises the rod shank 2, the reel 12, and the supporting stand 25 as described earlier. However, this embodiment substitutes for the signalling means 17 a different form of signalling means 55. The signalling means 55 comprises an arm 56 to one end of which is secured a flag or other suitable signal 57. The opposite end of the arm 56 is reversely turned at 58 to form an operating extension 59 having its free end 60 wrapped around the arm 56. Between its ends the extension 59 is provided with a loop 61 which rockably encircles a headed stud 62 forming a pivot axis about which the signalling means 55 may rock. A retainer or weight 63 is slideably mounted on the arm 56 between the ends 58 and 60 so as to be slideable longitudinally of the arm. The distance that the weight is located from the terminal end 60 of the extension may be adjusted by means of a rubbery or other suitable circlet 64 which frictionally grips the arm 56 but is adjustable longitudinally thereof.

In the use of the apparatus shown in FIG. g, the arm 56 is rocked about the axis of the stud 62 to the position shown in full lines and the retainer 63 is adjusted to a position in which it is rearward, or to the left, of the stud 62. In these positions of the parts the arm 56 will be maintained by gravity in its stored or inactive position. When a force is applied to the line 14 in such a direction as to rotate the reel 12 in the direction of the arrow A, the projection 16 will engage the operating extension 59 and rock the arm 56 clockwise from the position shown in full lines in FIG. g to the position shown in chain lines. As the arm 56 rocks about the axis of the stud 62, the weight 63 will slide toward the end 58 of the arm, thereby maintaining by gravity the arm 56 in its signalling position.

Inasmuch as the weight 63 is adjustable longitudinally of the arm 59, it may be adjusted to whatever position is required to maintain the arm in its stored position, regardless of the unevenness of the support on which the apparatus rests.

The embodiment shown in FIGS. 10-14 includes many of the characteristics previously disclosed. Accordingly, corresponding parts are designated by corresponding reference characters. In the embodiment shown in FIGS. 10-14 the reel 70 is a spinning reel having a spool 71 on which the fishing line 14 is wound. The reel 70 has a housing 72 provided with a mounting foot 73 which has forward and rearward ends 74 and 75, respectively. The foot end 74 is accommodated in a ferrule 76 fixed to the forward end of the handle 4 and the rear foot end 75 is fitted into a slideable ferrule 77 which may be maintained in fixed position by an adjusting nut 78 and a lock nut 79, both of which are threaded onto the handle 4.

Also carried by the handle 4 is a support 80 comprising an arcuate arm 81 having a rearwardly extending flange 82 which underlies the handle 4 and is accommodated in the ferrule 77 beneath the foot 73. The arm 81 terminates in an upstanding body 83 from the forward end of which extends a forwardly and outwardly inclined finger 84. The body 83 also supports a pivot post 85 terminating at its outer end in an enlarged head 86.

The support 80 is adapted to provide a pivotal and separable mount for signalling means 88 comprising an elongate arm 89 terminating at one end in an operating loop 90 from which extends a leg 91 which is bent at 92 to form a web 93 having an open loop 94 that accommodates the post 85 and underlies the head 86. From the loop 94 extends a leg the free end 96 of which is wrapped around the arm 89.

Mounted on the free end of the arm 89 is a signal flag 97. Also mounted on the arm 89 between the loop 90 and the terminal end 96 is a slideable retainer or weight 98.

To condition the apparatus for use the signalling means 88 is rocked to the position shown in FIG. 10 in which the arm 89 substantially parallels the rod shank 2. The retainer 98 is moved to a position rearward of the pivotal support 80, thereby maintaining the signalling flag 97 by gravity in an inactive or stored position. The line 14 is unwound from the spool 71 an amount sufficient to enable a part of the line to be placed around and to the rear of the now-upstanding operating loop 90.

When a force is applied on the line 14 in the direction of the free end of the rod, the portion of the line which extends around the operating loop 90 will rock the signalling member 88 from the position shown in FIG. 10 to the signalling position shown in FIG. 11. As the member 88 moves to the position shown in FIG. 11, the retainer 98 will slide toward the loop 90, thereby maintaining by gravity the arm 89 and the flag 97 in the signalling position.

The sensitivity of the signalling member 88 to the force applied by the line 14 depends upon the position of the retainer 98 when the arm 89 is in its inactive position. This position may be adjusted by means of a rubbery circlet 99 which is slideable along the arm 89. Again, because of the adjustability of the retainer 98 it is not necessary that the surface on which the apparatus is mounted be level.

To facilitate assembly of the rod shank 2, the support 80, and the signal member 88, the stud 85 may be removed from the loop 94 until the support is secured to the handle 4 and thereafter reassembled with the support 80. The finger 84 is in such position that the member 88 can be removed from the support 80 only when the member is in the position shown in FIG. 10. In all other positions of the member 88 the finger 84 precludes separation.

In the embodiment shown in FIGS. 15-18, the fishing rod 1 corresponds to that shown in FIGS. 1-8 with the differences set forth below.

The mounting foot 9 for the reel 12 has a laterally extending projection 100 adjacent its forward end to which is secured by means of a screw 101 or the like one arm 102 of a mounting member 103 for a signalling means 104. The mounting device 103 has an upstanding, frustoconical projection 105 which is accommodated within the open base of a conical spring 106. From the base of the spring 106 extends a hook 107 that may be accommodated in an opening (not shown) in the projection 105 so as to secure the spring to the mounting device 103.

The spring 106 terminates at its opposite end in an elongate, linear arm 108 adjacent the free end of which is a signalling flag 109. The free end of the arm 108 terminates in a hook 110.

Slideably mounted on the signalling arm 108 is a retainer 111 comprising a sleeve 112 in which the arm 108 is accommodated and from which extends a stepped finger 113 which is spaced from, but parallels the arm 108. The spacing between the finger 113 and the arm 108 is sufficient to accommodate the knob or projection 16.

The conical construction of the spring 106 enables the smaller diameter end to be more flexible than the larger diameter end, and it also enables that end of the arm 108 that is joined to the spring 106 to be more closely aligned with the longitudinal axis of the spring than would be the case if the spring 106 were of cylindrical configuration. The significance of this construction will be explained.

The mounting device 103 preferably includes a line guide or eyelet 114 which is supported by arms 115 anchored in an extension 116 of the mounting device 1-3. The purpose of the line guide 114 is to facilitate delivery of the fishing line 14 between the flanges 13 of the reel 11 upon rewinding of the line 14 on the spool.

In the condition of the parts shown in FIG. 15, the projection 16 is at about the 11 o'clock position and the arm 108 and the finger 113 are substantially horizontal. The projection 16 is accommodated in the space between the arm 108 and the finger 113 so as to latch the signalling device in its stored or inactive position. Upon rotation of the reel 12 in the direction of the arrow A, the projection will bear against the finger 113 and cause the arm 108 to deflect counterclockwise about the length of the spring 106. At the same time, the projection 16 will move relative to the finger 113 towards its free end. Eventually, the projection 16 will be disengaged from the finger 113, whereupon the arm 108 will move via the energy stored in the spring 106 to the active or signalling position shown in chain lines in FIG. 15.

The adjustability of the retainer 111 longitudinally of the signalling arm 108 makes it possible to adjust the force which must be required to be exerted on the reel 12 to effect its movement and the subsequent release of the signalling means 104. For example, if the projection 16 were to be moved from the position shown in FIG. 15 to the 12 o'clock position, relatively little force would be required to disengage the projection 16 from the finger 113 inasmuch as virtually all of the movement imparted to the projection in response to counterclockwise rotation thereof would be toward the free end of the finger 113. On the other hand, if the projection 116 originally occupies the 10 o'clock position, as is shown in dotted lines in FIG. 15, disengagement of the projection 16 from the retaining finger 113 requires further counterclockwise rocking of the signalling device about the spring 106, thereby materially increasing the force imposed on the reel against counterclockwise rotation thereof. The ability of the retainer 111 to slide longitudinally of the signalling arm 108 enables the projection 16 and retainer 111 to be located in any one of a number of selected positions of adjustment.

When the apparatus is not in use, the signalling arm 108 may be adjusted so that it projects forwardly of the reel 12, whereupon the hook 110 may be fitted about the rod shank 2 and enable the signalling device to be stored in a compact condition. The signalling arm of each of the other embodiments may include a hook like the hook 110 if desired.

The use of the conical spring 106 minimizes greatly the effects of temperature changes on the spring and the resulting shifting of the position of the signalling arm 108. For example, if the temperature of the spring increases the convolutions of the spring will elongate, thereby rotating shifting the arm 108 about the longitudinal axis of the spring. Shifting of the arm may cause it to interfere with or impose a lateral binding force on the reel. Since the arm is close to the longitudinal axis of the spring as a result of the use of the conical spring, the shifting of the arm due to temperature variations is minimal.

The disclosed embodiments are representative of presently preferred forms of the invention, but are intended to be illustrative rather than definitive thereof. The invention is defined in the claims.

I claim:

1. A fishing tip-up construction comprising a fishing rod having opposite ends; a reel having a fishing line wound thereon; means mounting said reel adjacent one end of said rod; a supporting stand; means mounting said stand on said rod between said reel and the opposite end, said stand comprising a body secured to said rod and a pair of legs pivoted on said body for movements between a first position in which said legs substantially parallel said rod and a second position in which said legs extend from said rod and form with said one end of said rod a three-point support for said rod; signal means; means mounting said signal means on said rod for movement from a stored position to a signalling position; retaining means for releasably holding said signal means in said stored position; and operating means responsive to the application of force on said fishing line in a direction to unwind said fishing line from said reel to overcome said retaining means and effect movement of said signal means from its stored position to its signalling position.

2. The construction according to claim 1 including means for releasably latching each of said legs in each of said positions.

3. The construction according to claim 1 wherein said body is recessed for the accommodation of a fish hook and wherein one of said legs carries a finger overlying said recess when said one of said legs is in said first position and retaining said hook in said recess.

4. The construction according to claim 1 including fishing line guide means carried by said body through which a fishing line may extend.

5. The construction according to claim 4 wherein said line guide means is wholly within the confines of said body.

6. The construction according to claim 4 wherein said line guide means projects from and beyond one side of said body.

7. The construction according to claim 1 wherein said signal means includes an arm formed of springy material and wherein said retaining means comprises a part carried by said reel and movable from a first position in engagement with said arm to a second position free of said arm.

8. The construction according to claim 7 wherein said arm includes a spring operable in response to movement of said part to said second position to move said arm to said signalling position.

9. The construction according to claim 8 wherein said spring is cylindrical.

10. The construction according to claim 8 wherein said spring is conical.

11. The construction according to claim 1 wherein said signal means includes an arm pivoted on said rod for rocking movements between said stored and said signalling positions, said retaining means comprising an adjustable weight carried by said arm.

12. The construction according to claim 11 wherein said reel has a part movable in response to rotation of said reel into engagement with said arm and thereby rock said arm from its stored position to its signalling position.

13. The construction according to claim 12 wherein said weight is movable relative to said arm to a position in which said weight maintains said arm in said signalling position in response to rocking movement of said arm to said signalling position.

14. The construction according to claim 11 wherein said weight is movable relative to said arm from a position in which it maintains said arm in said stored position by gravity to a position in which it maintains said arm in said signalling position by gravity.

15. The construction according to claim 11 wherein said arm has a projection thereon in engagement with said fishing line when said arm is in said signalling position, whereby the application of force in said direction on said fishing line is transmitted to said arm for rocking the latter to said signalling position.

16. The construction according to claim 1 wherein said signal means includes an arm and said retaining means comprises a part slideably mounted on said arm and engageable with said reel.

17. A fishing tip-up construction comprising an elongate fishing rod having forward and rearward ends, said rod being bent adjacent its rearward end at an obtuse angle to the remainder of said rod; a support body mounted on said rod between said ends and forward of the bend in said rod; a pair of support legs; means mounting each of said legs on said body for rocking movements between a retracted position alongside said rod and an extended position transverse of said rod, said legs when in said extended position forming with said rear end of said rod three support points for supporting said rod on a surface; a fishing reel on which a fishing line may be wound; means mounting said reel on said rod between said body and the bend in said rod, the angle at which said rearward end of said rod is bent and the length of the support legs being such as to provide sufficient space for the accommodation of said reel between said rod and said surface; signal means; means mounting said signal means on said rod for movement from a stored position to a signalling position; retaining means for removably maintaining said signal means in said stored position; and means responsive to the application in one direction of a force on said fishing line to effect movement of said signal means from said stored position to said signalling position.

18. The construction according to claim 17 wherein said reel is rotatable in response to the application of said force on said fishing line and wherein said responsive means comprises a part on said reel engageable with said signal means in response to rotation of said reel.

19. The construction set forth in claim 17 wherein said reel is rotatable in response to the application of said force on said fishing line and wherein said responsive means comprises a part carried by said reel in engagement with said signal means when the latter is in said stored position and movable out of engagement with said signal means in response to rotation of said reel.

20. The construction according to claim 17 including releasable latch means reacting between said body and each of said support legs for releasably maintaining such legs in either of said retracted and extended positions.

21. The construction according to claim 17 wherein said signal means comprises an arm rockable about an axis and said retaining means comprises a weight movably carried by said arm for biasing said signal means toward said stored position, said weight being movable in response to rocking of said arm about said axis to a position in which said weight biases said signal means toward said signalling position.

22. The construction according to claim 21 including a fitting carried by said rod and having a post defining said axis.

23. The construction according to claim 22 wherein said arm has a loop in which said post is rotatably accommodated.

24. The construction according to claim 22 wherein said fitting includes stop means for limiting linear movement of said arm relative to said post.

25. The construction according to claim 17 wherein said signal means comprises an arm, and wherein said retaining means comprises a first part carried by said arm and a second part carried by said reel, said first and second parts being engageable with and disengageable from one another.

26. The construction according to claim 25 wherein said first part is adjustable relative to said arm.

27. A fishing tip-up construction comprising a rotatable reel about which a fishing line may be wound; a signal arm; means supporting said arm for movement from a stored position to a signalling position; and retaining means carried by said signal arm reacting between said reel and said arm for releasably maintaining said signal arm in said stored position, said retaining means being responsive to rotation of said reel to release said retaining means and enable said biasing means to move said arm to said signalling position; said retaining means being adjustable relative to said arm.

28. The construction according to claim 27 wherein said biasing means comprises a spring.

29. The construction according to claim 28 wherein said spring is conical.

30. The construction according to claim 27 wherein said retaining means comprises a finger on said arm spaced from the latter a distance to accommodate between said finger and said arm a projection on said neck.

31. The construction according to claim 30 wherein said finger is slideable longitudinally of said arm.

* * * * *

UNITED STATES PATENT AND TRADEMARK OFFICE
CERTIFICATE OF CORRECTION

PATENT NO. : 5,152,093

DATED : October 6, 1992

INVENTOR(S) : Bernard A. Bartys

It is certified that error appears in the above-identified patent and that said Letters Patent is hereby corrected as shown below:

Column 3, line 12, change "g" to -- 9 --.

Column 4, line 58, change "g" to -- 9 --.

Column 5, line 9, change "g" to -- 9 --; line 19, change "g" to -- 9 --.

Column 7, line 51, cancel "rotating".

Column 10, line 31, before "and" insert -- means biasing said arm to said signalling position; --; line 47, change "neck" to -- reel --.

Signed and Sealed this

Fourteenth Day of September, 1993

Attest:

BRUCE LEHMAN

Attesting Officer

Commissioner of Patents and Trademarks